(12) United States Patent  (10) Patent No.: US 8,542,323 B2
Hardacker et al.  (45) Date of Patent: Sep. 24, 2013

(54) TOUCH SENSITIVE WIRELESS NAVIGATION DEVICE FOR REMOTE CONTROL

(75) Inventors: Robert Hardacker, Escondido, CA (US); Steven Richman, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1024 days.

(21) Appl. No.: 12/256,863

(22) Filed: Oct. 23, 2008

(65) Prior Publication Data

US 2009/0161027 A1  Jun. 25, 2009

Related U.S. Application Data

(60) Provisional application No. 61/015,891, filed on Dec. 21, 2007.

(51) Int. Cl.
*H04N 5/44* (2011.01)
*H04N 5/445* (2011.01)

(52) U.S. Cl.
USPC ..... 348/734; 348/552; 348/14.05; 348/14.02; 348/114; 340/426.13; 345/173

(58) Field of Classification Search
USPC ............... 348/734, 14.05, 14.02, 14.04, 552, 348/144; 340/426.13, 815.6; 725/81, 118, 725/133; 709/217, 218; 715/740; 345/173
See application file for complete search history.

(56) References Cited

U.S. PATENT DOCUMENTS 7,154,428 B2 12/2006 DeClercq et al.
7,647,343 B2 * 1/2010 Yamamichi et al. ... 707/999.107
2002/0060701 A1 5/2002 Naughton et al.
2002/0112237 A1 8/2002 Kelts
2003/0071792 A1 4/2003 Safadi
2006/0245736 A1 * 11/2006 Affaki ........................... 386/109
2007/0080845 A1 4/2007 Amand

FOREIGN PATENT DOCUMENTS

| CN | 1842790 A | 10/2006 |
| JP | 2001-025075 A | 1/2001 |
| JP | 2001-268664 A | 9/2001 |
| JP | 2005-128279 A | 5/2005 |
| WO | 03/098960 A1 | 11/2003 |
| WO | WO03100553 A3 | 12/2003 |
| WO | WO2004109553 | 12/2004 |

(Continued)

OTHER PUBLICATIONS

State Intellectual Property Office of the People's Republic of China, Office Action, CN Appl. No. 200880122236.5 dated Nov. 2, 2011.

(Continued)

*Primary Examiner* — Jefferey Harold
*Assistant Examiner* — Jean W Desir
(74) *Attorney, Agent, or Firm* — Sony Corporation (57) ABSTRACT

Remote control of an electronic device is achieved by retrieving a description of a control surface associated with the electronic device, rendering a graphical representation of at least portion of the control surface on a screen in accordance with the description and navigating the graphical representation using a navigation device that is remote from the first electronic device. The graphical representation may include multiple controls. The electronic device is operated in accordance with controls selected using the navigation device. The graphical representation may be displayed on the navigation device or on a remote screen. The controls to be displayed may be selected automatically dependent upon a selected operating mode.

19 Claims, 7 Drawing Sheets

(56) References Cited

FOREIGN PATENT DOCUMENTS

| WO | WO2005055165 A1 | 6/2005 |
|---|---|---|
| WO | WO2006134585 A1 | 12/2006 |
| WO | WO2007024271 A1 | 3/2007 |

OTHER PUBLICATIONS

Vito Technology, VITO remote is universal remote control software for your pocket PC, http://vitotechnology.com/en/products/remote.html, Sep. 15, 2004.

Universal Remote Control, Inc., Professional Product Line TX-1000, http://www.universalremote.com/profuct_detail.php?model=36, Mar. 30, 2006.

Universal Remote Control, Inc., Professional Product Line MX-850, http://www.universalremote.com/profuct_detail.php?model=38, Jan. 17, 2005.

Hardacker et al., PCT ISR and Written Opinion, PCT Appl. No. PCT/US08/86140, Jan. 26, 2009.

* cited by examiner

TOUCH SENSITIVE WIRELESS NAVIGATION DEVICE FOR REMOTE CONTROL

CROSS REFERENCE TO RELATED APPLICATIONS

This application claims priority to U.S. Provisional Patent Application No. 61/015,891 filed Dec. 21, 2007, which is hereby incorporated herein by reference.

BACKGROUND

There are several problems or concerns with current remote controls used for audio and video (AV) devices. For example, remote controls for televisions or set top boxes often appear complicated with a large number of buttons or controls. In addition, remote controls are constantly being upgraded, forcing a user to re-learn operation.

Even a single manufacturer may supply different remote controls for different television models. The development and production of specialized remote controls add cost, which may ultimately be passed onto the consumer. In addition, a user may have difficulty replacing a specialized remote control for older AV equipment.

These problems have encouraged the development of universal remote controls that are designed to operate with a large number of different AV devices.

Universal remote controls typically have the ability to reprogram buttons on the handset to operate in accordance with a particular device. The mapping between button and operation may be defined in a Command Configuration File (CCF) that may be stored on the remote control handset or received from the device to be controlled. This approach does not allow labeling of new button functions and may result in confusing button placement. In addition, too many buttons may have only a single function, resulting in a complicated control that is hard to use.

Attempts to overcome these shortcomings include the incorporation of a display screen on the remote control.

Touch-screens for automating and controlling home theaters have been used by custom equipment installers for some time. The installer may customize the interface to the client's needs specifically.

A touch-screen, such as used on the "TX-1000" remote control from Universal Remote Controls, Inc., allows text labeling of buttons displayed on the screen and reduces the number of buttons displayed at any one time.

A general purpose handheld computer with wireless communication function may be programmed with software (such as "Vito Remote", from Vito Technology) for use as a remote control handset. This allows the touch-screen of the device to display a generic graphic of a set of remote control buttons. The operation of the buttons may be configured using the Command Configuration Files for the AV device to be controlled.

It is also known that a remote control may be used to move a cursor displayed on an on-screen menu of a television. Typically, 'up', 'down', 'left' and 'right' buttons are used move the cursor, and a 'select' button is used to indicate selection of a menu item.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

The present invention relates to remote control of electronic devices. It has application, for example, to the remote control of consumer electronic devices such as televisions, set top boxes, network boxes, DVD players, home theater systems and audio systems. It also may be used for the control of other networked devices, such as thermostats, lighting systems, and home appliances. It may also be used for controlling industrial devices.

One problem with universal remote controls that use a touch-screen is that a generic screen view is used. Even though buttons displayed on the screen may be custom labeled, the appearance and layout of the buttons is predefined and may not be well suited to a particular device. While this is useful in helping a user switch from one device to the next, it limits the number of devices that can be controlled, since it does not allow new features or graphical layouts to be used. In addition, it does not allow a manufacturer to control arrangement or appearance of the buttons.

Although a specific physically buttoned remote control can be emulated with screen view, it is not limited to "photo-realism", but is in fact a graphical interface which may treat every button & label as separate entity whose shape, color, size, location, font, et al are limited only by the imagination. Photorealism can be useful to some users as their traditional physical keypad remote is replaced with a virtual keypad.

Figure 1:
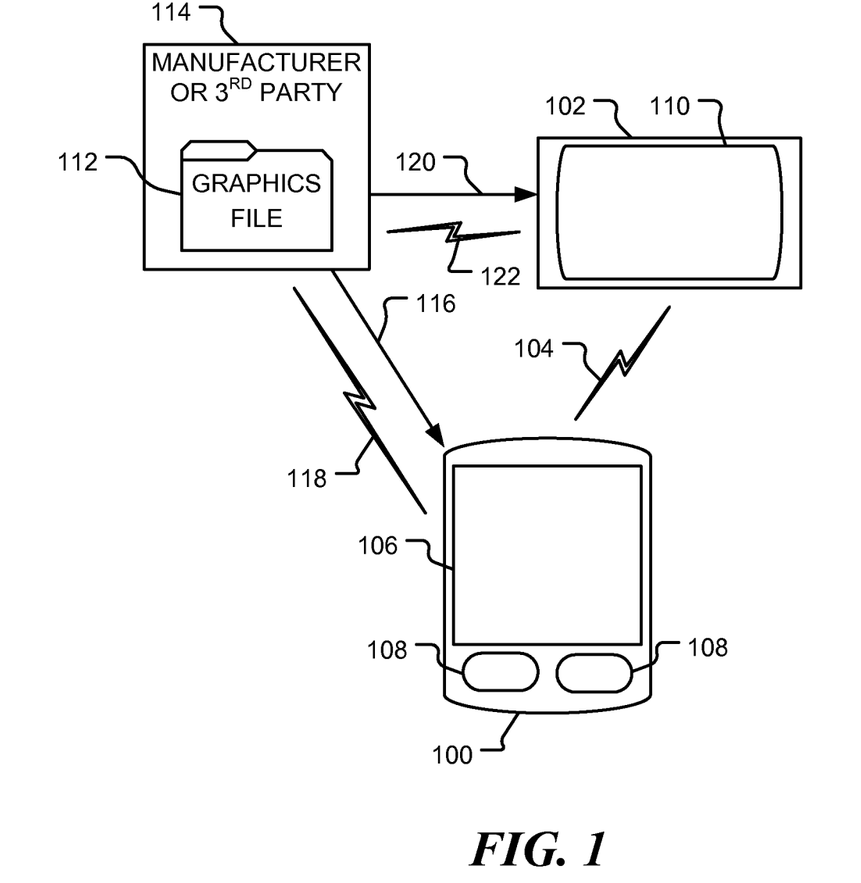
FIG. 1 is a diagrammatic representation of a system for enabling remote control of an electronic device consistent with certain embodiments of the invention.

FIG. 1 is a diagrammatic representation of a system, consistent with certain embodiments of the invention, for enabling remote control of an electronic device. Referring to FIG. 1, a navigation device 100 is used to control one or more electronic devices 102, such as a television and set top box, using a wireless communication link 104. The navigation device 100 includes touch sensitive pad 106 and, optionally, one or more buttons or other controls 108. In one embodiment, the touch sensitive pad 106 is combined with a display screen, such as an LCD screen, to form a touch sensitive display screen or touch screen. The electronic device 102 (either the device to be controlled or a device linked to it) may include a display screen 110. At least one of the screens 106 and 110 is used to display a graphical representation of at least part of a physical control surface, such as a remote control handset or the control panel of a device to be controlled. In one embodiment of the invention, a description of the appearance of the control surface is contained in a graphics file 112. The graphics file 112 may be generated by the manufacturer 114 of the electronic equipment or by $3^{rd}$ party (also shown as 114). In an embodiment in which the navigation device 100 includes a screen 106, the graphics file 112 may be copied to a memory of the navigation device by a wired link 116 or wireless link 118 or it may be pre-programmed into the memory of the device. The wired link 116 or the wireless link 118 may comprise a computer network, such as the Internet. The graphics file may also be copied to a memory of the electronic device 102, again by a wired link 120 or wireless link 122 or it may be preprogrammed into the memory of the electronic device.

In accordance with one embodiment of the present invention, a graphical representation of all, or part, of a physical control surface is displayed on a screen, either screen 106, screen 110 or both. The physical control surface may be a conventional remote control handset having a number of buttons, for example. The user operates the wireless navigation device 100 to control the graphical representation and to select features displayed in the representation. Again, the screen may be a small screen 106, such an LCD screen, integrated with the wireless navigation device 100, or may be the screen 110 of television 102 that is remote from the navigation device.

The graphical representation may be a windowed view of a remote control handset or control panel, in which case the position of the window, and possibly its size, may be controlled by the user.

For a manufacturer 114, this provides cost savings since a common navigation device 100 may be used with multiple electronic devices 102. However, the type, number, layout and appearance of the graphical representation may still be customized for each electronic device using the graphics file 112. This enables custom designs and art work to be used with different electronic devices 102. For example, a single navigation device 100 could be used with many different television models 102.

The navigation device 100 may be used as a universal remote control handset. The graphics file is able to define a graphical representation that closely matches an original device-specific remote control. A user switching from a device-specific remote control to the universal remote control would not have to relearn operation of the interface and that the manufacturer's original operation manual may be used. Additionally, the ergonomic layout of the device-specific remote can be retained.

When the electronic device 102 is a television, the graphical display on the television will be referred to as a virtual control surface (VCS). A corresponding display on the remote navigation device 100 may be the complete VCS, a 'windowed' version of the complete VCS or a subset of the buttons or other elements (such as rotary knobs or sliders) of the VCS.

Figure 2:
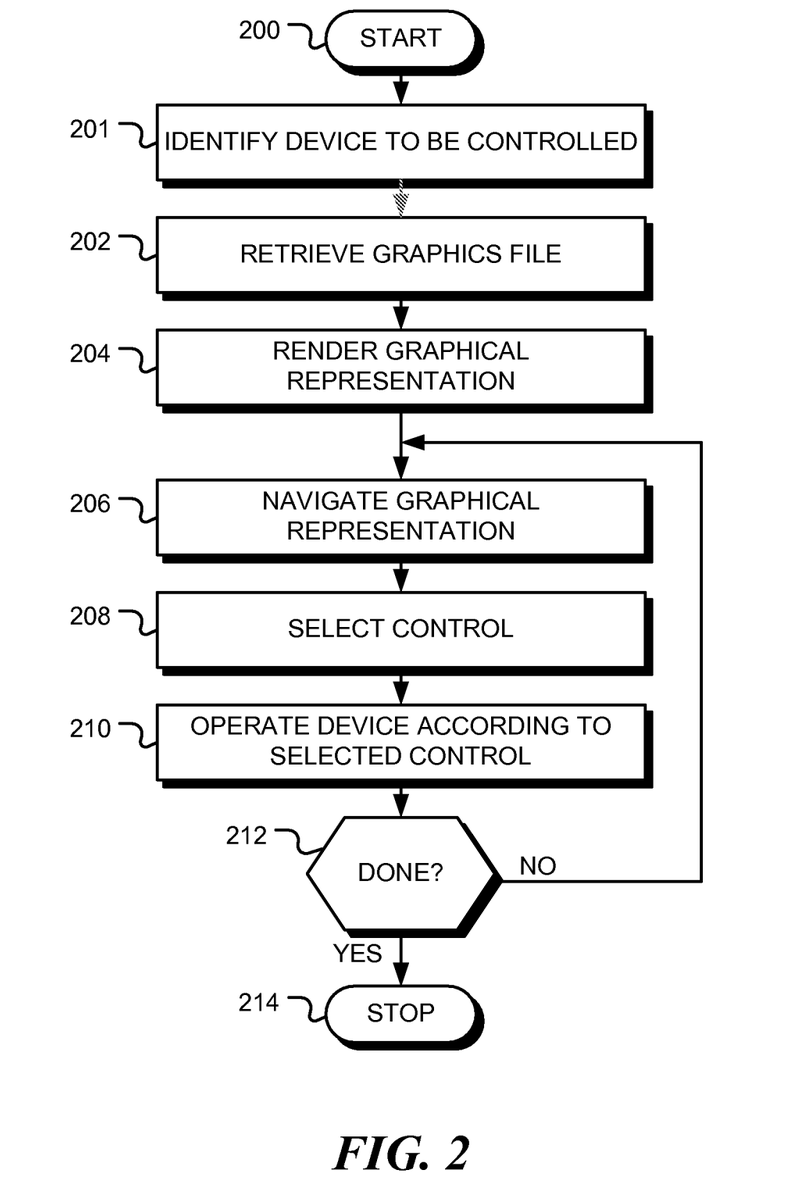
FIG. 2 is a flow chart of a method, consistent which certain embodiments of the invention, for remote control of an electronic device.

FIG. 2 is a flow chart of a method, consistent which certain embodiments of the invention, for remote control of an electronic device. Following start block 200 in FIG. 2, the device to be controlled is identified at block 201. A description of the appearance of a control surface associated with the electronic device to be controlled is retrieved at block 202. This description may be a graphics file that defines an image of a remote control handset or a control panel, for example. At block 204, a graphical representation of at least a portion of the control surface is rendered on a screen in accordance with the retrieved description. The rendering device may retrieve the graphics file from an internal memory or from a remote location. For example, the file could be retrieved via the Internet from a remote server, or the file could be retrieved by the navigation device from the device to be controlled using a short range wireless communication link. The graphical representation may include a number of controls such as buttons, rotary knobs or sliders, for example. At block 206, a navigation device, remote from the electronic device, is used to navigate the graphical representation. The navigation device is used to select a displayed control at block 208, and at block 210, the electronic device is operated in accordance with the selected control. If no more operations are required, as depicted by the negative positive branch from decision block 212, the method terminates at block 214. Otherwise, as depicted by the positive negative branch from decision block 212, flow returns to block 206.

Again, the graphical representation may be displayed on a screen of the navigation device, or on a remote screen, such as a television screen, or on both screens.

Figure 3:
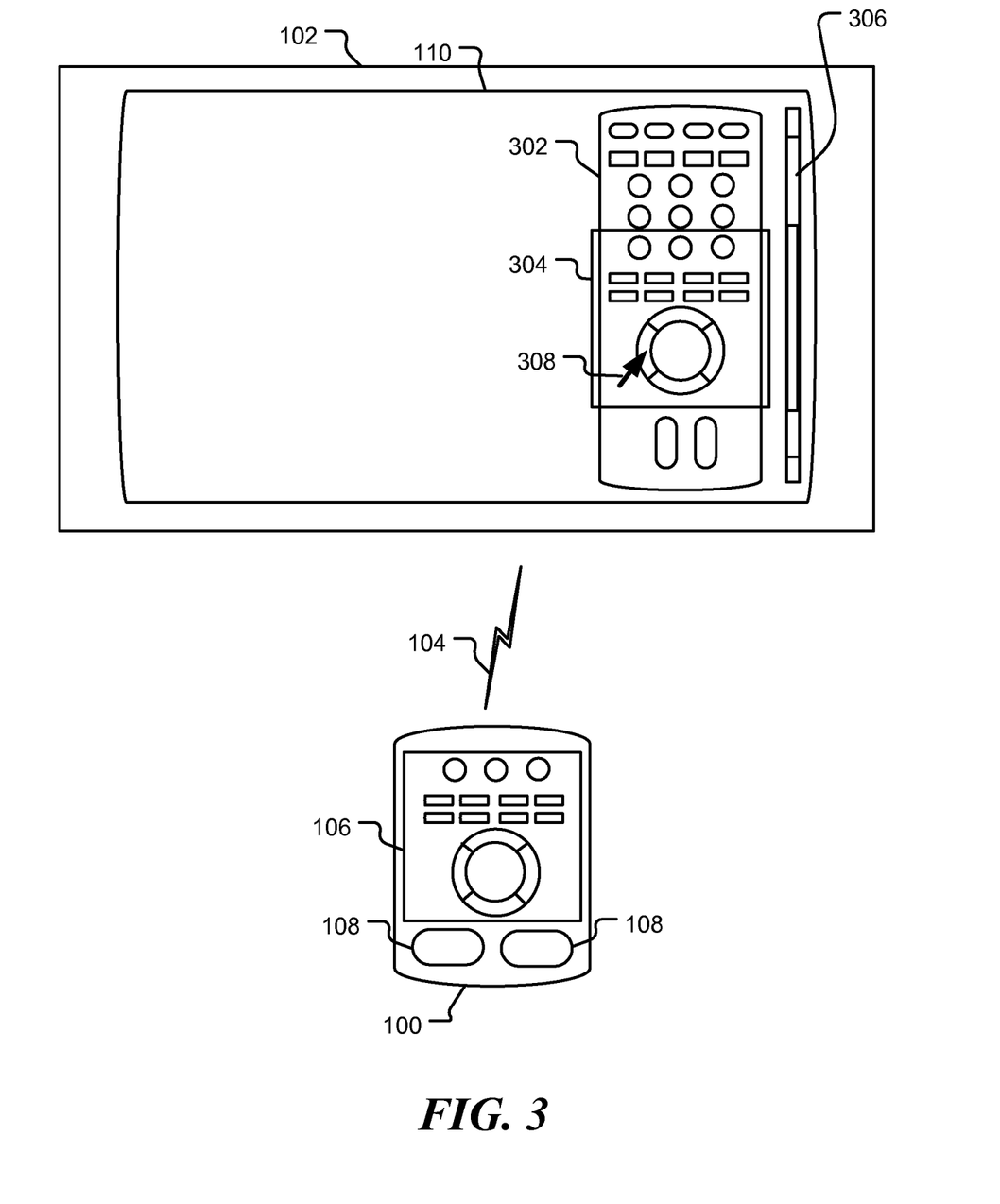
FIG. 3 is a diagrammatic representation showing remote control of an electronic device, consistent which certain embodiments of the invention.

FIG. 3 is a diagrammatic representation showing remote control of an electronic device consistent with certain embodiments of the invention. In FIG. 3, the electronic device is a television 102 having a display screen 110. The display screen 110 displays a graphical representation 302 of one or more control surfaces. In this example, the virtual control surface (VCS) is a single remote control handset. In one embodiment of the invention, a window 304 may also be displayed. A user may move the window 304 over the VCS to show different regions of the VCS. Optionally, a slider, or window bar 306, located vertically on one side or the other of the screen 110, may be used to control the position of the window 304 over the VCS 302. This is similar in function to the scroll bar as exhibited on a personal computer application such as a web browser or word processor. A user may control the position of the window 304 by sliding a digit up or down on a touch pad or touch screen 106 of the navigation device 100 for example. The sliding window 304 is displayed on the VCS 302 on the television 102 and the corresponding windowed region is displayed on the screen 106 of the navigation device 100. For example, the VCS 302 might display the current windowed section in full color with a three-dimensional appearance, while the remainder of the remote control handset is displayed as 'grayed out' and in two dimensions. Moving a thumb or finger over a virtual button on the screen of the navigation device would cause the corresponding button on VCS display to be emphasized by growing slightly larger, brighter, or appearing three dimensional, for example. Alternatively, a cursor 308 may be used to display a current position in the window.

Confirmation that a selected button has been depressed, may be indicated by, for example, flashing or dimming the button, or by showing the button in a depressed position in a 3-dimensional appearance, or by a combination of these methods. An audio confirmation, such as a click, may also be provided.

Figure 4:
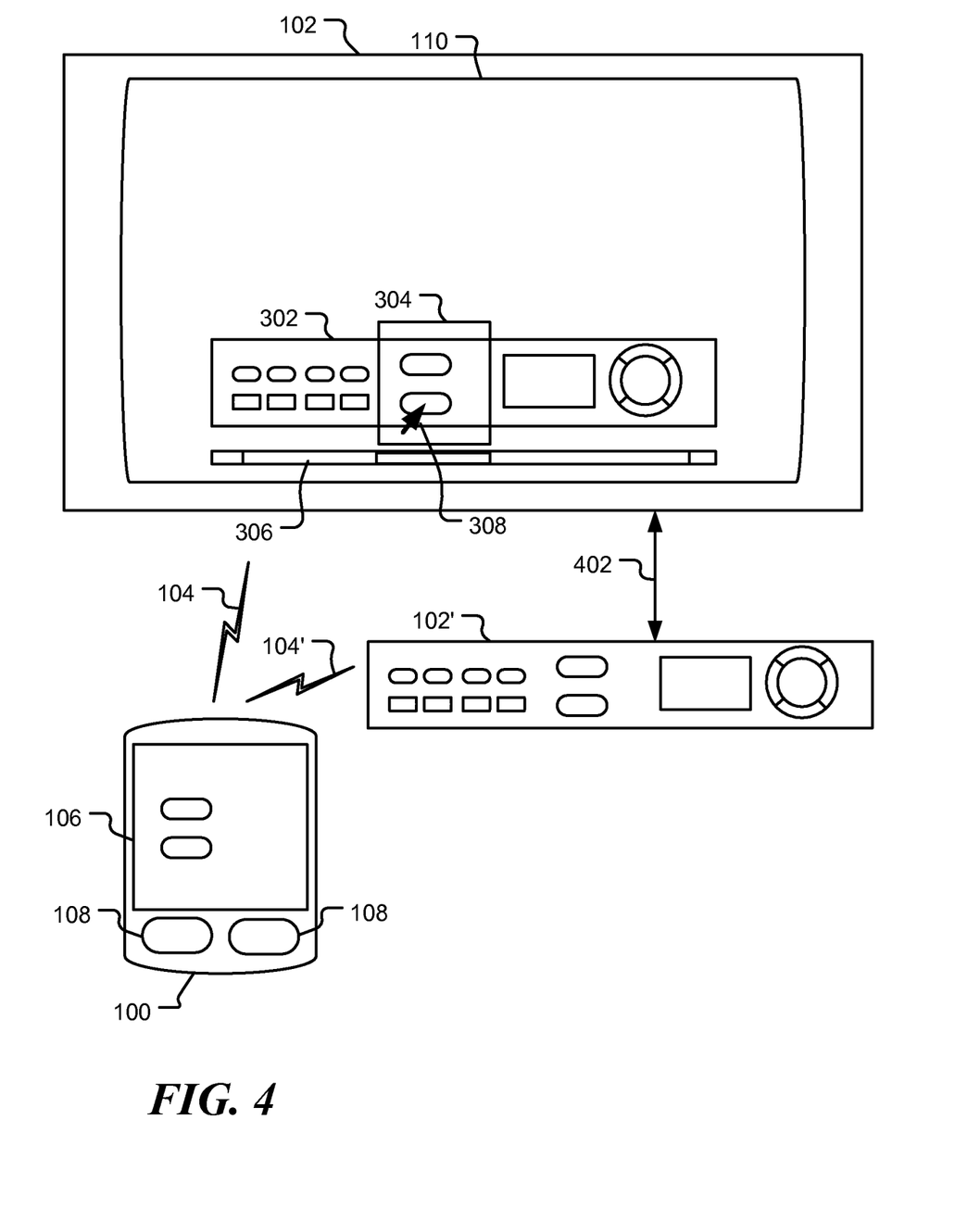
FIG. 4 is a diagrammatic representation of a system for remote control, consistent which certain embodiments of the invention.

The navigation device 100 may be used to control multiple electronic devices. Some electronic devices do not have remote control handsets, or have an integrated control panel. In a further embodiment of the invention, the remote screen, or a television screen if present, may display a graphical representation of the control panel of the device to be controlled. Again, the remote screen may show a windowed region of the complete control panel. FIG. 4 is a diagrammatic representation of an example system, consistent with certain embodiments of the invention. In FIG. 4, the electronic device 102' does not have a graphics display screen, but a graphical representation 302 of the control panel of the electronic device is shown on the screen 110 of television 102. As in FIG. 3, the region of the VCS 302 is selected using a window 304 that may be controlled by a slider 306, for example. The navigation device 100 may used to control the position of the window 304 and the position of a cursor 308, and is used to select virtual controls on the VCS 302. In a first embodiment, the windowed region of the VCS is displayed on a screen 106 of the navigation device 100. In this embodiment, control signals may be sent from the television 102 to the electronic device 102' over link 402, or from the navigation device to electronic device 102' over wireless link 104'. In the latter case, the television 102 may communicate to the navigation device 100 which control has been selected. In a second embodiment, for example, in which the touch pad 106 has no display, the VCS is displayed on the television screen 110 only. In a third embodiment, where no television used, the VCS, or a portion of the VCS, is displayed on a touch screen 106 of the navigation device 100. The user may adjust the size of the window 304 so that the displayed controls are larger and easier to read for the visually impaired.

In one embodiment, the navigation device 100 possesses a series of "mode" buttons that, when activated, initiate certain operating modes. For example, a "DVD mode" would turn on the DVD player & the television and generate a subset of buttons useful for watching and controlling these two devices. A command would be sent to the appropriate device. For example, a "GOTO TOP MENU" command might be sent only to the DVD player.

Figure 5:
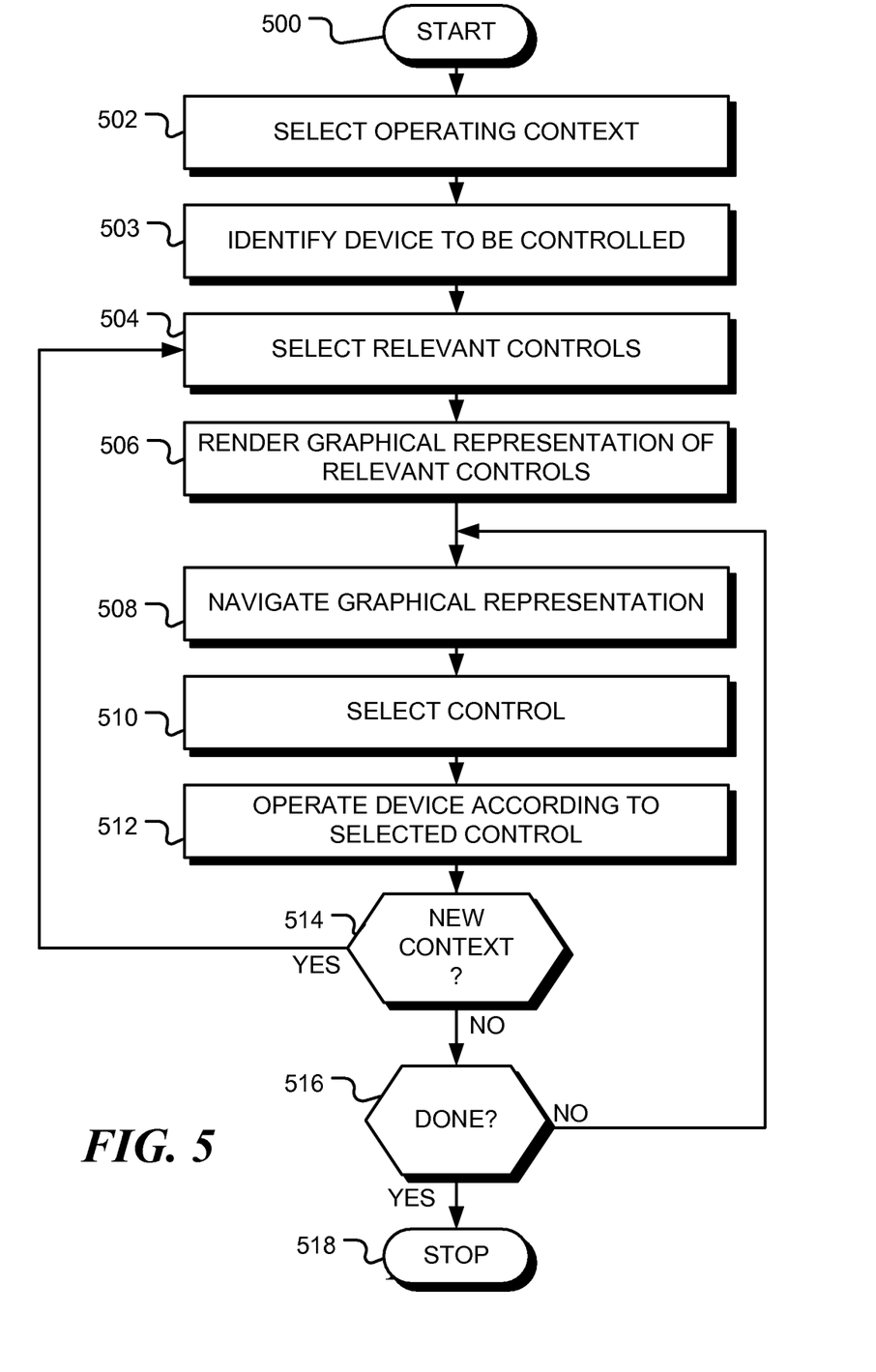
FIG. 5 is a flow chart of a method, consistent which certain embodiments of the invention, for operation of a remote control handset.

In one mode of operation, both the local and remote screens show a graphical representation of the controls for one or more devices. The navigation device may operate in a 'Multi-Adaptive Graphical Interface Control' (MAGIC) mode in which only a subset of the buttons from one or more of the controlled devices are displayed. An exemplary flow chart of operation in a MAGIC mode is shown in FIG. 5. Following start block 500 in FIG. 5, a user selects an operating context at block 502. The operating context may be, for example, standard television, DVD plus television, audio only etc. The device to be controlled is identified at block 503. Depending upon the selected operating context, the controls relevant to this context are automatically selected at block 504. At block 506, only the buttons or other controls that are required or are most often used for the selected operating context are displayed on the VCS or navigation device. Superfluous buttons are hidden to simplify the control interface. For example, in a TV & DVD mode, the DVD transport controls are displayed, but not the TV channel buttons. In a TV only mode, the DVD controls are not shown. In a menu browsing context, only navigation controls may be shown.

In the MAGIC mode, multiple devices may be turned on simultaneously and their configurations changed appropriately. For example, inputs and screen settings may be changed and unnecessary function (such as channel up/down) disabled. A pre-determined graphical representation is displayed that eliminates the unused buttons. The pre-determined graphical representation may be edited by the user. For example, the user could select which buttons are displayed, vary the positions of the buttons, alter the shape of the buttons, or alter the color of the buttons.

The MAGIC mode eliminates the complexity of conventional remote controls by eliminating typically unused buttons.

When used in 'Full' mode, all the buttons of the separate TV and DVD remote controls are displayed on the VCS and the windowing effect allows access to all of them.

In an embodiment where the navigation device does not have a display screen, a control screen of a controlled device or other remote screen is used. For example, if an audio system is linked to a television, the television may be used to display a graphical representation of the front panel of the audio system. A navigation system without a display is cheaper to manufacture and uses less power, but is limited in application to systems that include a display screen. The remote display may duplicate the windowing effect of a display on the navigation device, and the MAGIC mode may still be used to recognize the buttons most commonly used in the current operating context. That is, unused buttons are hidden and buttons relevant to the current context are displayed. This simplifies the control interface for users without sacrificing full functionality. The buttons can re-appear when 'Full' mode is selected.

Figure 6:
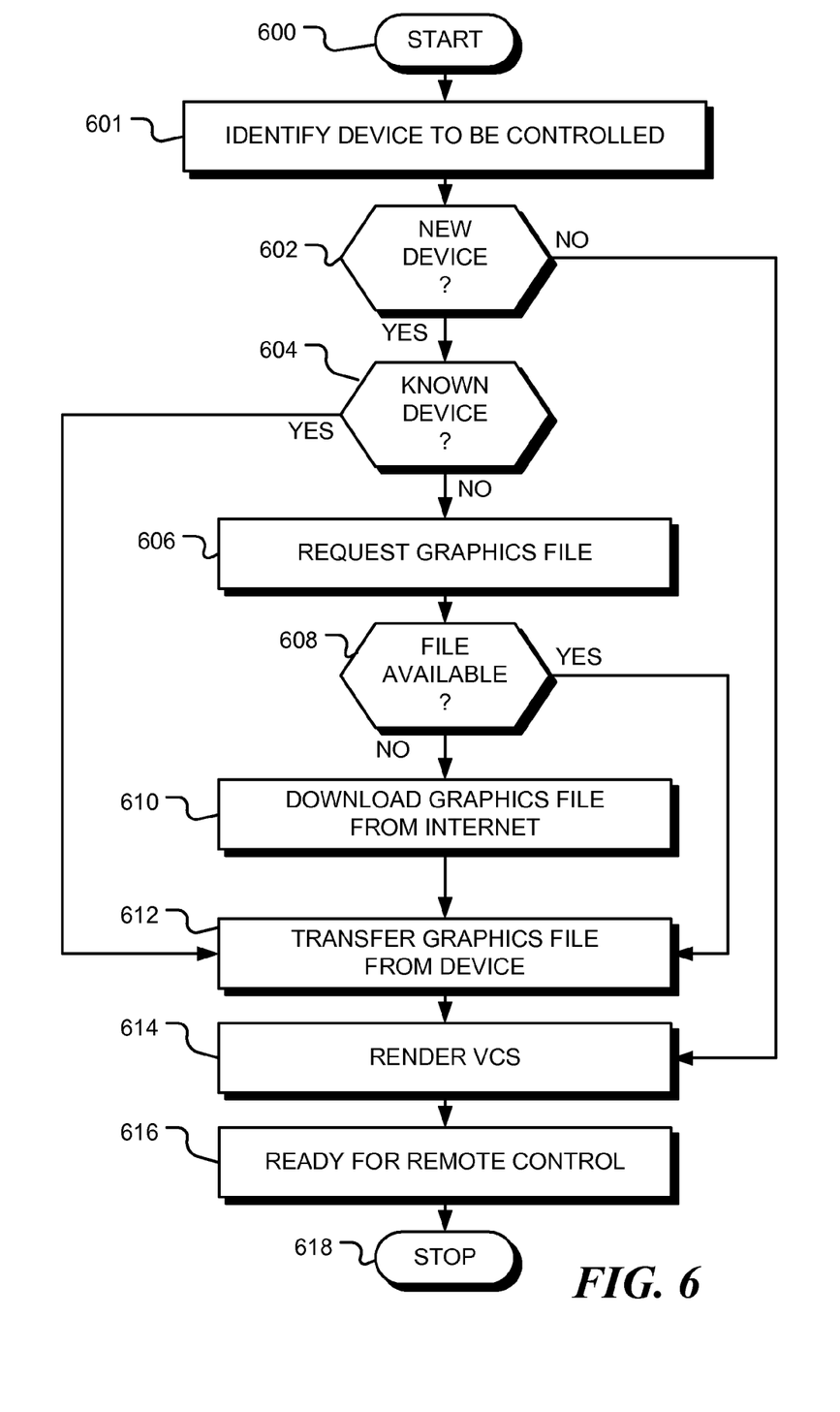
FIG. 6 is a flow chart of a method, consistent which certain embodiments of the invention, for retrieving a graphics file.

The graphical representation is rendered from a description of the control surface. This description may be in the form of computer readable graphics file, for example. FIG. 6 is a flow chart of a method, consistent with certain embodiments of the invention, for obtaining a graphics file. In this example, it is assumed that the navigation device has a screen. Following start block 600, the device to be controlled is identified at block 601. A check is made by the navigation device at decision block 602 to determine if the device to be controlled is a new. This may be done, for example, by the navigation device querying the device to be controlled for an identifier and the navigation device checking the identifier against a list of identifiers of previously controlled devices. If the device to be controlled is new, as depicted by the positive branch from decision block 602, a check is made at decision block 604 to determine if the device to be controlled is already known to the navigation device, that is, if a corresponding graphics file is stored in a memory of the navigation device. If not, as depicted by the negative branch from decision block 604, the navigation device requests an appropriate graphics file from the device to be controlled at block 606. If no graphics file is available in the device to be controlled, as depicted by the negative branch from decision block 608 (that is, no file is available for this type of navigation device), the device to be controlled may download an appropriate file from a network such as the Internet, for example, at block 610. Once the file is available on the device to be controlled, the file is transmitted to the navigation device at block 612 and stored in memory. Alternatively the controller device may download the graphics file from a network, such as the internet, either directly to the control device or through an intermediary such as the TV. The file is then available on the navigation device and the virtual control surface, or at least part of it, is rendered on the screen of the navigation device. The graphics file may include definitions of the commands associated with each control of the VCS in addition to data or instructions that describe the appearance of the VCS. In one embodiment, the file contains a description of the graphics to be rendered and the specific commands and functions for the devices to be controlled. For example, a "use case primitive" for a TV and DVD player could be assembled that included most of the basic commands and functions. When the specific TV and DVD models are known, the exact commands can be plugged into the primitive and all the subtleties for the interactions of the devices can be included.

A relatively small number of "primitives" for specifying command-control is required. These correspond to various combinations of devices, such as: TV-DVD; TV-STB (cable or satellite); TV-PVR; etc. These primitives may be stored in a local memory of the controlled device or navigation device. The specific commands and functions associated with the exact model of device allow for the customization of the primitives to an easy-to-use user interface.

It will be apparent to those of ordinary skill in the art that the graphics file may be a single file or a collection of files. The navigation device is now ready for remote control of the electronic device, as depicted by block 616. The method terminates at block 618.

If the navigation device does not have a screen, the VCS may be rendered by another device. In this case, the file is made available to the rendering device, either by transmission from the device to be controlled or by download from a network server, or by download from the navigation device.

Similarly, when the navigation device and a remote screen are to render the VCS, the graphics file may be made available to both devices.

The rendering device, whether the navigation device or a television, may communicate with the device to be controlled over a wireless link such as a Bluetooth link or near field communication (NFC) link to exchange the graphics file. The link may be a radio link, an optical link (such as infrared), a magnetic link or an ultrasonic link, for example. This approach allows the navigation device to become a true 'universal' remote control. For example, when the navigation device has a display screen, all or part of the graphics file may be transferred to the remote control. This may be done before the navigation device is first used and also at other times, since the graphics file on the controlled device may be updated.

Figure 7:
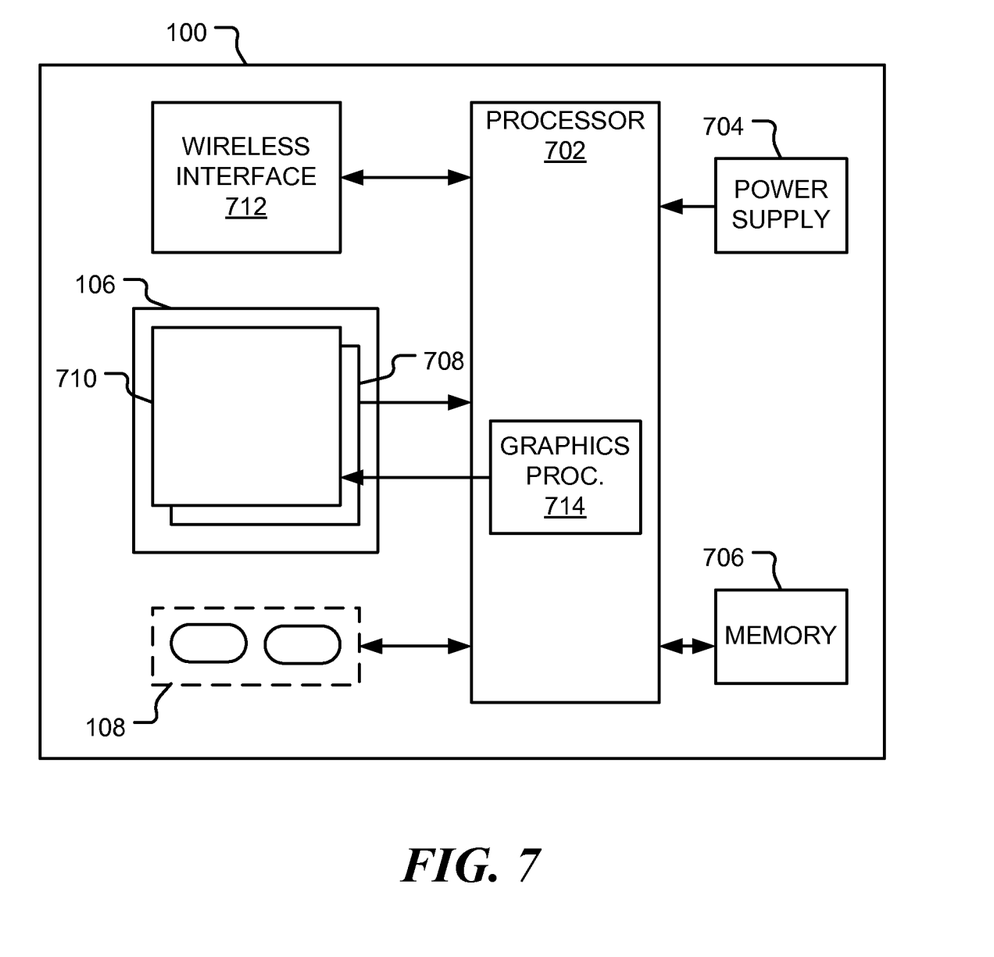
FIG. 7 is a simplified block diagram of a navigation device consistent with certain embodiments of the invention.

FIG. 7 is a simplified block diagram of a navigation device in accordance with certain embodiments of the invention. Referring to FIG. 7, the navigation device 100 includes a processor 702, a power supply 704 and a memory 706. The processor may be a general purpose processor, an application specific integrated circuit or reconfigurable processor, such as a field programmable gate array (FPGA), for example. The memory may be used to store program instructions for the processor and to store commands that can be transmitted to a device being controlled. The processor is coupled to a touch pad 106, which includes a touch and position sensitive control 708 and, optionally, a display screen 710. A wireless interface 712 is used to provide remote communication with the device to be controlled. The interface may use a radio frequency or infrared link, for example. The wireless interface may also include a near field radio link. Buttons or other controls 108 are also coupled to the processor and may be used independently or in conjunction with the touch pad 106.

When a display screen 710 is included, the memory 706 is able to store one or more graphics files that describe the graphical representations to be shown on the display screen. These graphics files may be loaded via the wireless interface 712. The processor 702 includes a graphics processor 714 that is able to render images to be displayed on the display screen 710. The touch sensitive pad 708 may be used to navigate the displayed image. Other interfaces, such as buttons, rollerball, or joystick, for example, may be used to navigate the image.

Those of ordinary skill in the art will recognize that the present invention has been described in terms of exemplary embodiments. However, the invention should not be so limited, since the present invention could be implemented using hardware component equivalents such as special purpose hardware and/or dedicated processors, which are equivalents to the invention as, described and claimed. Other wireless communication and visual display techniques may be used. The memory may be a combination of one of more of a Read Only Memory (ROM), a Random Access Memory (RAM), an optical storage element, a magnetic storage element, a magneto-optical storage element, a flash memory and/or other equivalent storage element without departing from the present invention. Such alternative storage devices should be considered to be equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for remote control of a plurality of electronic devices, the method comprising:

retrieving a description of a control surface associated with the plurality of electronic devices;

rendering a graphical representation of a portion of the control surface on a screen in accordance with the description, the graphical representation comprising a plurality of controls, wherein rendering a graphical representation of the portion of the control surface comprises rendering a graphical representation of a subset of the plurality of controls, wherein the subset of the plurality of controls is selected based on a selected mode of operation operable to control a predefined set of the plurality of electronic devices;

receiving a selection of a control of the subset of the plurality of controls on a navigation device; and operating one or more of the predefined set of the plurality of electronic devices associated with the selected mode of operation in accordance with the selected control.

2. A method in accordance with claim 1, wherein the screen is located on one of the navigational device or one of the plurality of electronic devices remote from the navigation device.

3. A method in accordance with claim 2, wherein the screen comprises a touch-screen and wherein selecting a control of the plurality of controls comprises touching the touch screen at an appropriate position.

4. A method in accordance with claim 1, wherein the navigation device comprises a touch sensitive pad.

5. A method in accordance with claim 1, further comprising: selecting the mode of operation involving a first electronic device and at least one second electronic device, wherein the plurality of controls comprises a subset of the controls of the first electronic device and the at least one second electronic device, the subset of controls being appropriate for the selected mode of operation.

6. A method in accordance with claim 5, wherein selecting a control of the plurality of controls affects operation of at least one of the first electronic device and the at least one second electronic device.

7. A method in accordance with claim 1, wherein the control surface comprises a remote control handset.

8. A method in accordance with claim 1, wherein the control surface comprises a control panel.

9. A method for remote control of a plurality of electronic devices, the method comprising:

retrieving descriptions of a plurality of control surfaces associated with the plurality of electronic devices;

rendering a graphical representation of a portion of the control surfaces associated with the plurality of electronic devices on a screen in accordance with the retrieved descriptions, the graphical representation comprising a plurality of controls, wherein rendering the graphical representation of a portion of the control surfaces comprises rendering a graphical representation of a subset of the plurality of controls, wherein the subset of the plurality of controls is selected based on a selected mode of operation, and wherein the selected mode of operation is operable to control a predefined set of the plurality of electronic devices;

receiving a selection of a control of the plurality of controls on a navigation device; and operating one or more of the predefined set of the plurality of electronic devices in accordance with the selected control.

10. A method for remote control of a plurality of electronic devices, the method comprising:

retrieving a description of a control surface associated with the plurality of electronic devices;

rendering a graphical representation of a portion of the control surface on a screen in accordance with the description, the graphical representation comprising a plurality of controls;

receiving a selection of a control of the plurality of controls on a navigation device, wherein the plurality of controls comprises a subset of the controls associated with the plurality of electronic devices, wherein the subset of controls is selected based on a selected mode of operation, and wherein the selected mode of operation is operable to control a predefined set of the plurality of electronic devices; and operating the the predefined set of the plurality of electronic devices in accordance with the selected control, wherein rendering a graphical representation of a portion of the control surface comprises rendering a graphical representation of a windowed view of the control surface displayed on a remote screen.

11. A method in accordance with claim 10, further comprising controlling at least one of the size and position of the window shown in windowed view of the control surface.

12. A wireless navigation device comprising:

a display screen;

a memory operable to store a description of a control surface for a plurality of electronic devices to be controlled;

a graphics processor operable to render an image of a portion of the control surface based on a selected mode of operation, and wherein the selected mode of operation is operable to control a predefined set of the plurality of electronic devices, the image of the portion of the control surface corresponding to a windowed portion of the control surface displayed on a remote screen;

a navigation interface operable to enable a user to interact with the rendered image to control operation of the predefined set of the plurality of electronic devices; and a wireless interface operable to enable communication between the navigation device and the predefined set of the plurality of electronic devices to be controlled.

13. A wireless navigation device in accordance with claim 12, wherein the navigation interface comprises a touch sensitive pad.

14. A wireless navigation device in accordance with claim 12, wherein the wireless interface is operable to receive the description of the control surface from each of the plurality of electronic devices to be controlled.

15. A wireless navigation device comprising:

a navigation interface operable to present a graphical representation of a plurality of controls of a physical control surface displayed on a remote screen for controlling operation of a plurality of electronic devices; and a wireless interface operable to establish communication between the wireless navigation device and the plurality of electronic devices, wherein a subset of the plurality of controls are selected based on a selected mode of operation, and wherein the selected mode of operation is operable to control a predefined set of the plurality of electronic devices.

16. A wireless navigation device in accordance with claim 15, wherein the navigation interface comprises a touch sensitive pad.

17. A wireless navigation device in accordance with claim 15, wherein the physical control surface comprises a remote control handset.

18. A wireless navigation device in accordance with claim 15, wherein the physical control surface comprises a control panel.

19. A wireless navigation device in accordance with claim 15, wherein activation of a graphically represented control causes a plurality of commands to be sent, at least one command being sent to each of the plurality of electronic devices, the commands being selected automatically dependent upon the selected mode of operation.

* * * * *